US012432824B2

(12) United States Patent
Feng et al.

(10) Patent No.: US 12,432,824 B2
(45) Date of Patent: Sep. 30, 2025

(54) COOKING APPLIANCE WITH MICROWAVE HEATING FUNCTION

(71) Applicants: GUANGDONG GALANZ ENTERPRISES CO., LTD., Foshan (CN); GUANGDONG GALANZ MICROWAVE ELECTRICAL APPLIANCES MANUFACTURING CO., LTD., Zhongshan (CN)

(72) Inventors: Liangwang Feng, Zhongshan (CN); Feng Li, Zhongshan (CN)

(73) Assignees: GUANGDONG GALANZ ENTERPRISES CO., LTD., Foshan (CN); GUANGDONG GALANZ MICROWAVE ELECTRICAL APPLIANCES MANUFACTURING CO., LTD., Zhongshan (CN)

( * ) Notice: Subject to any disclaimer, the term of this patent is extended or adjusted under 35 U.S.C. 154(b) by 1004 days.

(21) Appl. No.: 17/607,968

(22) PCT Filed: Nov. 20, 2020

(86) PCT No.: PCT/CN2020/130653
§ 371 (c)(1),
(2) Date: Nov. 1, 2021

(87) PCT Pub. No.: WO2021/115105
PCT Pub. Date: Jun. 17, 2021

(65) Prior Publication Data

US 2023/0254950 A1 Aug. 10, 2023

(30) Foreign Application Priority Data

Dec. 11, 2019 (CN) ......................... 201911269015.7

(51) Int. Cl.
*H05B 6/64* (2006.01)
*H05B 6/66* (2006.01)

(52) U.S. Cl.
CPC ........... *H05B 6/642* (2013.01); *H05B 6/6414* (2013.01); *H05B 6/664* (2013.01)

(58) Field of Classification Search
CPC ........ G16B 20/00; G16B 20/20; G16B 20/40; G16B 30/00; H05B 6/6414; H05B 6/642; H05B 6/664; H05B 6/6426; H05B 6/80
(Continued)

(56) References Cited

U.S. PATENT DOCUMENTS 7,105,786 B2 * 9/2006 Kanzaki .............. H05B 6/6479 219/710
2018/0028834 A1 2/2018 Saks
(Continued)

FOREIGN PATENT DOCUMENTS

CN 105011739 A 11/2015
CN 204813367 U 12/2015
(Continued)

OTHER PUBLICATIONS

Chinese Patent Office, Notice of Allowance issued in corresponding Application No. 201911269015.7, dated Oct. 30, 2024, 4 pp.
(Continued)

*Primary Examiner* — Quang T Van
(74) *Attorney, Agent, or Firm* — Taft Stettinius & Hollister LLP

(57) ABSTRACT

A cooking appliance with microwave heating function includes a cooker body, a first fan, a second fan, a variable frequency power supply and a magnetron. When the cooking appliance with microwave heating function works, on the one hand, the first fan draws in the air outside the cooker body through the side air inlet mesh and the bottom air inlet mesh, and blows it to the variable frequency power supply for heat dissipation. The large amount of air entering has a good heat dissipation effect on the variable frequency power supply. The second fan draws in the air outside the cooker body through the bottom air inlet mesh or the side air inlet mesh, and blows it to the magnetron for heat dissipation, which achieves a good heat dissipation effect on the magnetron.

10 Claims, 6 Drawing Sheets

(58) Field of Classification Search
USPC ....... 219/757, 680, 682, 685, 702, 710, 711, 219/712, 716, 718, 731, 756
See application file for complete search history.

(56) References Cited

U.S. PATENT DOCUMENTS

| | | | | |
|---|---|---|---|---|
| 2018/0288834 | A1 | 10/2018 | Li et al. | |
| 2022/0221162 | A1* | 7/2022 | Feng | F24C 15/30 |

FOREIGN PATENT DOCUMENTS

| | | | |
|---|---|---|---|
| CN | 205191665 | U | 4/2016 |
| CN | 106322454 | | 1/2017 |
| CN | 206300225 | U | 7/2017 |
| CN | 110477763 | A | 11/2019 |
| CN | 110894960 | A | 3/2020 |
| CN | 211695026 | U | 10/2020 |
| JP | 4416720 | B2 | 2/2010 |
| WO | 2017015780 | A1 | 2/2017 |

OTHER PUBLICATIONS

International Search Report for Application No. PCT/CN2020/130653 dated Feb. 5, 2021, 5 pages.

Written Opinion for Application No. PCT/CN2020/130653 dated Feb. 5, 2021, 4 pages.

Canadian Office Action for corresponding Application No. 3,139,350 dated Jan. 10, 2023, 5 pages.

* cited by examiner

COOKING APPLIANCE WITH MICROWAVE HEATING FUNCTION

CROSS REFERENCE TO RELATED APPLICATIONS

This is a U.S. National Stage application of, and claims priority to, PCT/CN2020/130653, filed Nov. 20, 2020, which further claims priority to Chinese Patent Application No. 201911269015.7, filed Dec. 11, 2019, the disclosures of which are incorporated herein by reference in their entirety.

TECHNICAL FIELD

The present disclosure relates to a cooking appliance, in particular to a cooking appliance with microwave heating function.

BACKGROUND

Cooking appliances, especially cooking appliances with microwave heating function, such as microwave ovens with simple microwave heating function, microwave barbecue machines with heating tube barbecue function, microwave steamer with steam heating function or machine integrated with microwave, steam and roasting functions, which are illustrated by taking a microwave oven as an example in the following. Microwave ovens use high-frequency microwaves generated by energizing magnetrons to heat food. The heat generated by the microwave oven itself mainly comes from the magnetron and the power supply. It is necessary to pay attention to the heat dissipation of these two components, otherwise the service life of the microwave oven is easily to be reduced. However, under the premise that the volume of the microwave oven is fixed, it is necessary to reduce the space for placing other components in order to increase the volume of the cooking cavity for placing food inside the microwave oven, which will reduce the heat dissipation space of these components, resulting in reducing the heat dissipation effect.

SUMMARY

Accordingly, it is necessary to overcome the defects of the prior arts and provide a cooking appliance with microwave heating function, which can increase the volume of the cooking cavity while reducing the heat dissipation effect.

The technical solutions are as follows:

A cooking appliance with microwave heating function includes a cooker body, a first fan, a second fan, a variable frequency power supply and a magnetron.

The cooker body includes first outer housing and a cooking cavity provided in the first outer housing. The first outer housing includes a first side cover plate, a rear cover plate and a bottom cover plate, the first side cover plate is connected to the rear cover plate, and the first side cover plate and the rear cover plate are both connected to the bottom cover plate. The first side cover plate is provided with a side air inlet mesh at one of corner parts thereof close to the rear cover plate and the bottom cover plate, and the bottom cover plate is provided with a bottom air inlet mesh at one of corner parts thereof close to the first side cover plate and the rear cover plate. The first fan, the second fan, the variable frequency power supply and the magnetron are all arranged in a spacing region between the rear wall of the cooking cavity and the rear cover plate. A plane where an air inlet of the first fan is located is arranged obliquely with respect to the bottom cover plate, and faces the side air inlet mesh and the bottom air inlet mesh. A plane where the air outlet of the first fan is located is arranged to face the variable frequency power supply. A plane where the air inlet of the second fan is located faces the bottom air inlet mesh or the side air inlet mesh, and a plane where the air outlet of the second fan is located is arranged to face the magnetron.

When the aforementioned cooking appliance with microwave heating function works, on the one hand, the first fan draws in the air outside the cooker body through the side air inlet mesh and the bottom air inlet mesh, and blows it to the variable frequency power supply for heat dissipation, the large amount of air entering has a good heat dissipation effect on the variable frequency power supply. The second fan draws in the air outside the cooker body through the bottom air inlet mesh or the side air inlet mesh, and blows it to the magnetron for heat dissipation, which achieves a good heat dissipation effect of the magnetron. On the other hand, the plane where the air inlet of the first fan is located is arranged obliquely with respect to the bottom cover plate, thus compared with a horizontal arrangement, the occupation space of the first fan in a horizontal direction can be reduced to a certain extent, which can increase the volume of the cooking cavity while reducing the heat dissipation effect.

In an embodiment, the rear cover plate is provided with a first rear air inlet mesh at one of corner parts thereof close to the first side cover plate and the bottom cover plate.

In an embodiment, the first fan is arranged above the second fan, an included angle between a first central axis of the first fan and a second central axis of the second fan is A, and A is less than 90°.

In an embodiment, the second fan is a turbo fan, an upper surface and a lower surface of the turbo fan are both provided with air inlets, the lower surface of the turbo fan is connected to a first air guide cover, a top plate of the first air guide cover is provided with a first vent in communication with the air inlet of the lower surface of the turbo fan, the fan motor of the turbo fan is arranged in the first air guide cover, the first air guide cover covers a part of a region of the bottom air inlet mesh, and a projection of the first fan on the bottom cover plate along a vertical direction is located on another part of the region of the bottom air inlet mesh.

In an embodiment, a ventilation gap is provided between the first fan and the second fan.

In an embodiment, a second outer housing of the variable frequency power supply is provided with a first lateral ventilation channel, and the air outlet of the first fan is in communication with one end of the first lateral ventilation channel, an outer wall of the other end of the first lateral ventilation channel is connected to a vertical spacing plate and a lateral spacing plate, the vertical spacing plate and the lateral spacing plate are arranged in periphery of the magnetron, a second vent is provided on the vertical spacing plate, and the air outlet of the second fan is in communication with the second vent.

In an embodiment, a power connector of the magnetron is arranged adjacent to the lateral spacing plate, the lateral spacing plate is provided with a third vent corresponding to the power connector of the magnetron, and the third vent is located on a side of the lateral spacing plate close to the vertical spacing plate.

In an embodiment, the cooking appliance with microwave heating function further includes a second air guide cover, a radiator shell of the magnetron is provided with a second lateral ventilation channel, the rear wall of the cooking cavity is provided with a second rear air inlet mesh which is covered by the second air guide cover, the second vent, the second lateral ventilation channel, and an air inlet of the second air guide cover are in communication in sequence.

In an embodiment, the air inlet of the second air guide cover is provided with a heat conducting edge which is attached to the magnetron.

In an embodiment, the cooking appliance with microwave heating function is a drawer-type microwave oven, which further includes a door and a container for placing cooking objects connected to the door, and the door is connected to a side wall of the cooking cavity via a slide rail.

DESCRIPTION OF REFERENCE SIGNS

Figure 1:
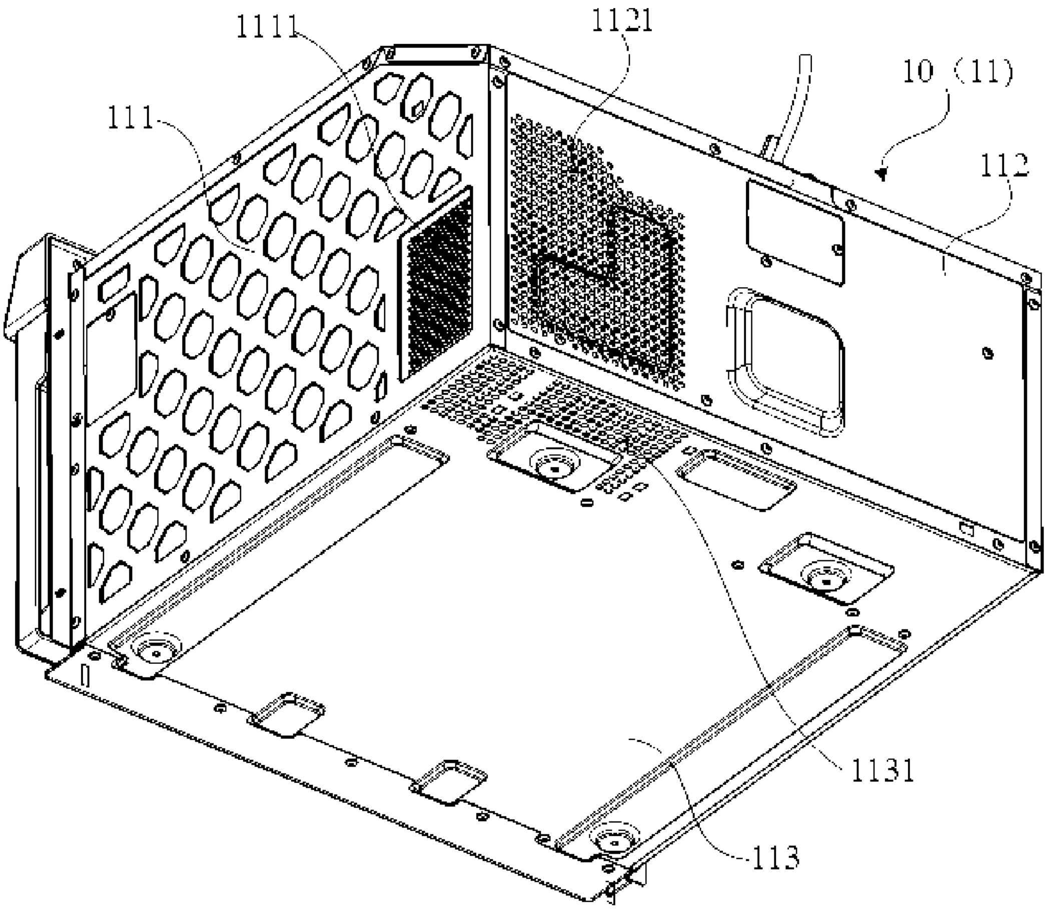
FIG. 1 is a perspective view of a cooking appliance with microwave heating function according to an embodiment of the present disclosure.
Figure 2:
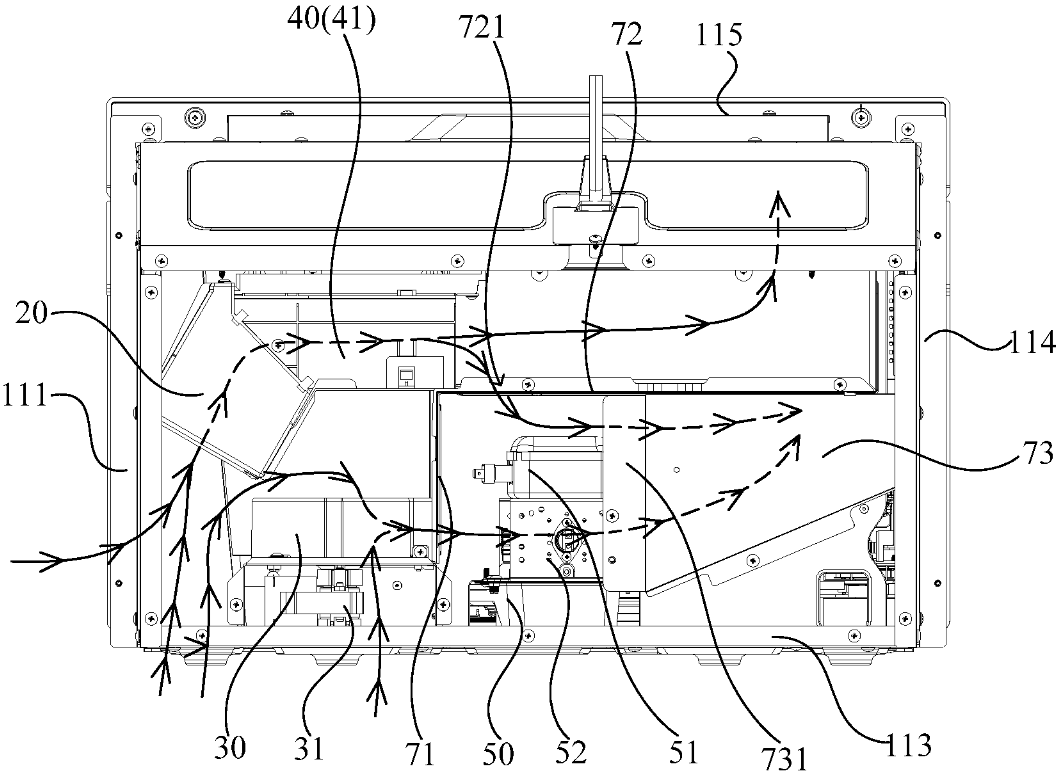
FIG. 2 is a schematic structural view of the cooking appliance with microwave heating function according to an embodiment of the present disclosure, with a rear cover plate removed.
Figure 3:
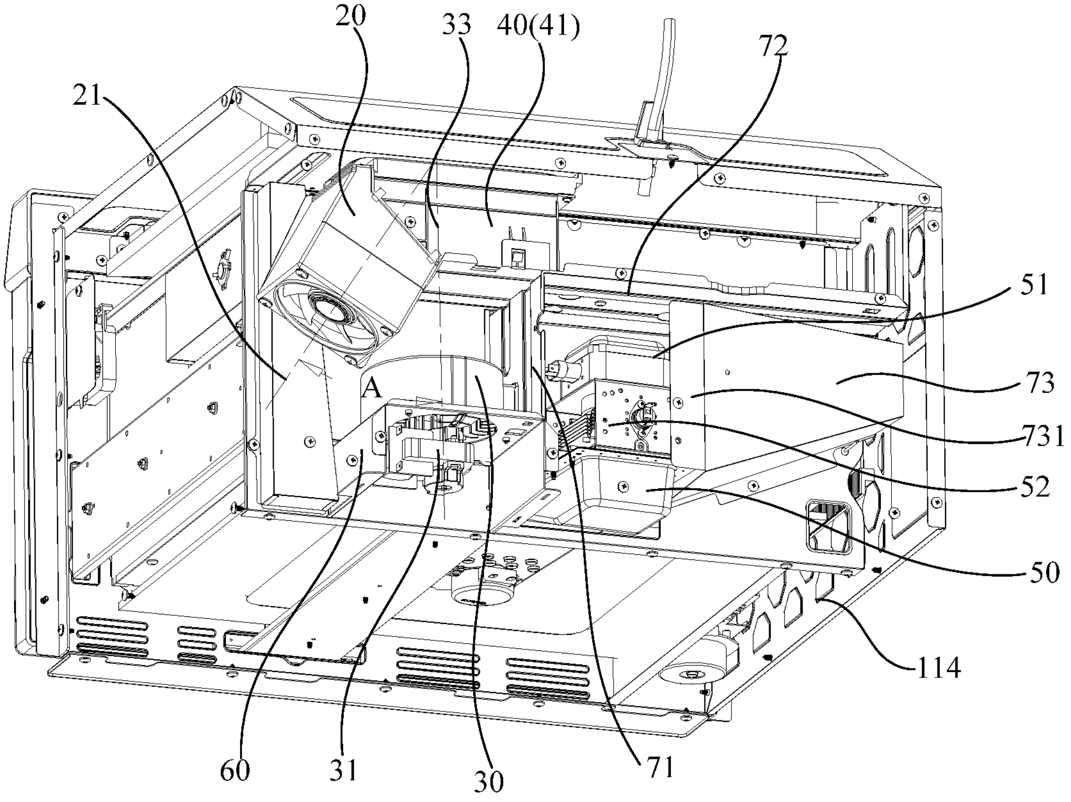
FIG. 3 is a schematic structural view of the cooking appliance with microwave heating function according to an embodiment of the present disclosure, with a first side cover plate, the rear cover plate and a bottom cover plate removed.

10—cooker body; 11—first outer housing; 111—first side cover plate; 1111—side air inlet mesh; 112—rear cover plate; 1121—first rear air inlet mesh; 113—bottom cover plate; 1131—bottom air inlet mesh; 114—second side cover plate; 115—top cover plate; 12—cooking cavity; 121—second rear air inlet mesh; 20—first fan; 21—first central axis; 30—second fan; 31—fan motor; 32—ventilation gap; 33—second central axis; 40—variable frequency power supply; 41—second outer housing; 50—magnetron; 51—power connector; 52—radiator shell; 60—first air guide cover; 61—baffle; 62—mounting plate; 71—vertical spacing plate; 711—second vent; 72—lateral spacing plate; 721—third vent; 73—second air guide cover; 731—heat conducting edge; 80—door.

DETAILED DESCRIPTION

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term “present invention” is not intended to limit the scope of the claimed invention, but is instead used to discuss exemplary embodiments of the invention for explanatory purposes only.

In order to make the aforementioned objectives, features and advantages of the present disclosure more obvious and understandable, the specific embodiments of the present disclosure will be described in detail below with reference to the accompanying drawings. In the following description, many specific details are explained in order to fully understand the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that the terms “first” and “second” are only used for description purposes, and cannot be understood as indicating or implying relative importance or implicitly indicating the number of the indicated technical features. Therefore, the features defined with “first” and “second” may explicitly or implicitly include at least one of the features. In the description of the present disclosure, “plurality” means at least two, such as two, three, etc., unless otherwise specifically defined.

In the description of the present disclosure, it can be understood that, when an element is considered to be “connected” to another element, it can be directly connected to another element or indirectly connected to another element with a mediating element. In contrast, when an element is described to be “directly” connected to another element, there are no mediating elements.

In an embodiment, referring to FIGS. 1 to 3 and 5, a cooking appliance with microwave heating function includes a cooker body 10, a first fan 20, a second fan 30, a variable frequency power supply 40 and a magnetron 50. The cooker body 10 includes a first outer housing 11 and a cooking cavity 12 arranged in the first outer housing 11. The first outer housing 11 includes a first side cover plate 111, a rear cover plate 112 and a bottom cover plate 113. The first side cover plate 111 is connected to the rear cover plate 112, and the first side cover plate 111 and the rear cover plate 112 are both connected to the bottom cover plate 113. The first side cover plate 111 is provided with a side air inlet mesh 1111 at one of corner parts thereof close to the rear cover plate 112 and the bottom cover plate 113. The bottom cover plate 113 is provided with a bottom air inlet mesh 1131 at one of corner parts thereof close to the first side cover plate 111 and the rear cover plate 112. The first fan 20, the second fan 30, the variable frequency power supply 40 and the magnetron 50 are all arranged in a spacing region between a rear wall of the cooking cavity 12 and the rear cover plate 112. A plane where an air inlet of the first fan 20 is located is arranged obliquely with respect to the bottom cover plate 113, and faces the side air inlet mesh 1111 and the bottom air inlet mesh 1131. A plane where an air outlet of the first fan 20 is located is arranged to face the variable frequency power supply 40. A plane where an air inlet of the second fan 30 is located faces the bottom air inlet mesh 1131 or the side air inlet mesh 1111, and a plane where an air outlet of the second fan 30 is located is arranged to face the magnetron 50.

When the aforementioned cooking appliance with microwave heating function works, on the one hand, the first fan 20 draws in the air outside the cooker body 10 through the side air inlet mesh 1111 and the bottom air inlet mesh 1131, blows it to the variable frequency power supply 40 for heat dissipation, and the large amount of air entering has a good heat dissipation effect on the variable frequency power supply 40; and the second fan 30 draws in the air outside the cooker body 10 through the bottom air inlet mesh 1131 or the side air inlet mesh 1111, and blows it to the magnetron 50 for heat dissipation, which achieves a good heat dissipation effect of the magnetron 50. On the other hand, the plane where the air inlet of the first fan 20 is located is arranged obliquely with respect to the bottom cover plate 113, thus compared with a horizontal arrangement, the occupation space of the first fan 20 in a horizontal direction can be reduced to a certain extent, which can increase the volume of the cooking cavity 12 while reducing the heat dissipation effect.

Further, referring to FIGS. 1 to 3 and FIG. 5, the rear cover plate 112 is provided with a first rear air inlet mesh 1121 at one of corner parts thereof close to the first side cover plate 111 and the bottom cover plate 113. In this way, when the first fan 20 and the second fan 30 work, the air outside the cooker body 10 can also enter the cooker body 10 through the first rear air inlet mesh 1121 to increase the air intake quantity and to ensure better heat dissipation effect.

Further, referring to FIGS. 1 to 3 and FIG. 5, the first fan 20 is arranged above the second fan 30, an included angle between a first central axis of the first fan 20 and a second central axis of the second fan 30 is A, and A is less than 90°. It should be explained that the first central axis 21 of the first fan 20 refers to an axial line perpendicular to the plane where the air inlet of the first fan 20 is located, and the second central axis 33 of the second fan 30 refers to an axial line perpendicular to the plane where the air inlet of the second fan 30 is located. Specifically, the included angle A between the first central axis 21 of the first fan 20 and the second central axis 33 of the second fan 30 is 30°~40°, preferably, A is 36°.

Further, referring to FIGS. 2 to 6, the second fan 30 is a turbo fan, an upper surface and a lower surface of the turbo fan are provided with air inlets, and the lower surface of the turbo fan is connected to a first air guide cover 60. A top plate of the first air guide cover 60 is provided with a first vent in communication with the air inlet of the lower surface of the turbo fan. A fan motor 31 of the turbo fan is provided in the first air guide cover 60. The first air guide cover 60 covers a part of a region of the bottom air inlet mesh 1131, and the projection of the first fan 20 on the bottom cover plate 113 along the vertical direction is located on another part of the region of the bottom air inlet mesh 1131. In this way, the first air guide cover 60 can divide air entering the first outer housing 11 through the bottom air inlet mesh 1131 into two independently isolated air, one of which is sucked in through the air inlet of the first fan 20, and the other is sucked in through the air inlet of the second fan 30, and the two air flows will not be chaotic and partially offset, which improves the utilization rate of cold air and ensures the heat dissipation effect. In addition, the fan motor 31 of the turbo fan is arranged in the first air guide cover 60, and the air flow entering the first air guide cover 60 has a heat dissipation effect on the fan motor 31, so that the service life of the fan motor 31 is prolonged.

Figure 4:
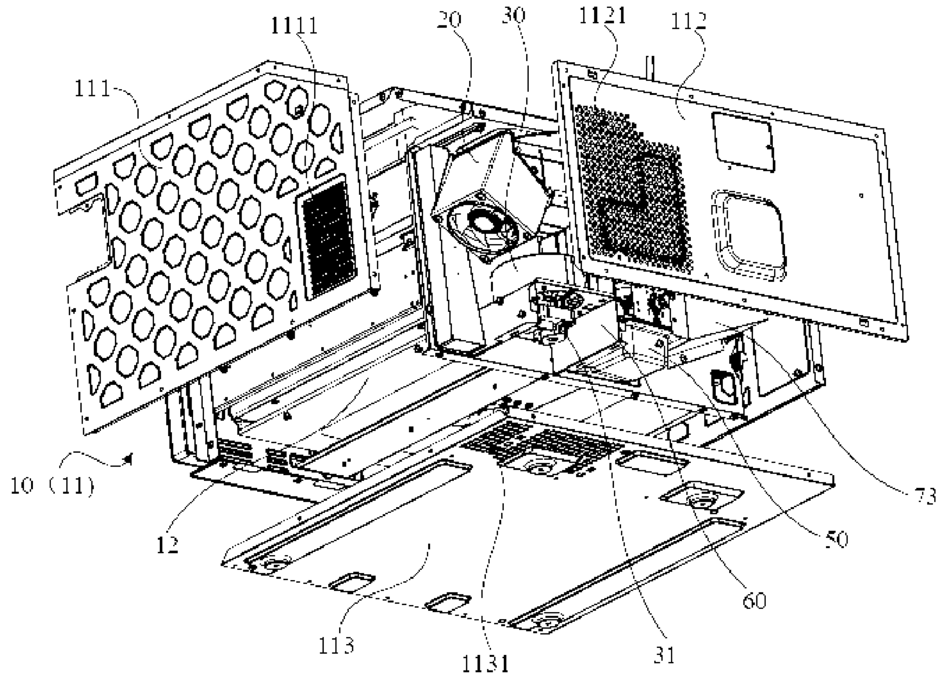
FIG. 4 is a schematic exploded view of the cooking appliance with microwave heating function according to an embodiment of the present disclosure.
Figure 5:
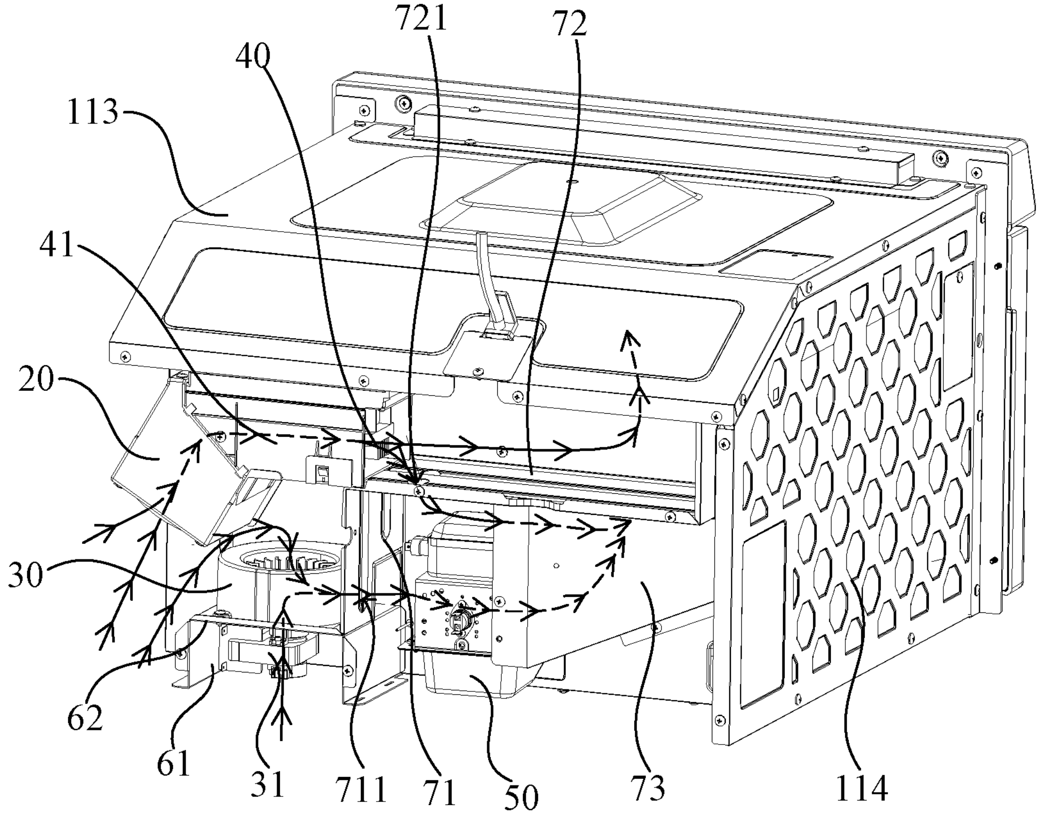
FIG. 5 is a schematic structural view of the cooking appliance with microwave heating function according to an embodiment of the present disclosure in another perspective, with the first side cover plate, the rear cover plate and the bottom cover plate removed.
Figure 6:
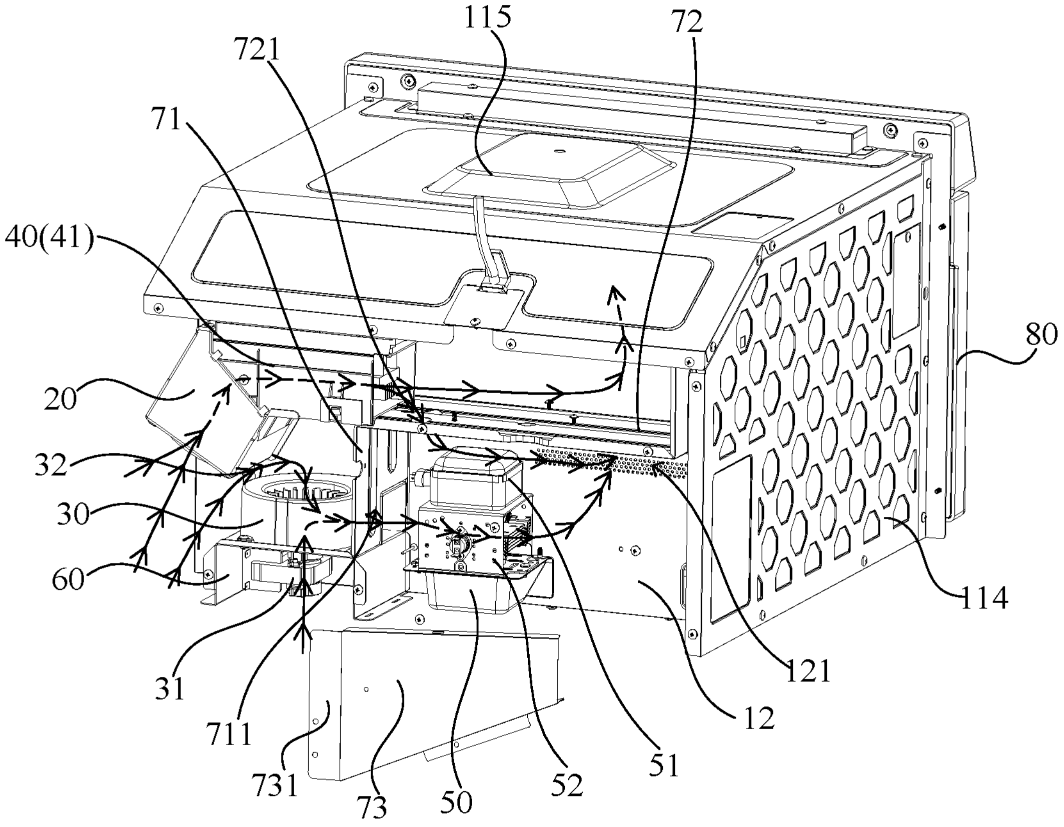
FIG. 6 is a schematic structural view of the cooking appliance with microwave heating function according to an embodiment of the present disclosure in a perspective, with the first side cover plate, the rear cover plate and the bottom cover plate removed, and with a second air guide cover separated.

Specifically, referring to FIGS. 4 to 6, the first air guide cover 60 includes two baffles 61 arranged at intervals and a mounting plate 62 connecting the two baffles 61. The first vent is formed on the mounting plate 62. The baffle 61 is connected to the rear wall of the cooking cavity 12 and the rear cover plate 112 respectively. The fan motor 31 of the second fan 30 is arranged between the two baffles 61. A region between the two baffles 61 is opposite to the first rear air inlet mesh 1121 of the rear cover plate 112, and outside air can enter between the two baffles 61 through the first rear air inlet mesh 1121. In addition, the mounting plate 62 is opposite to the bottom air inlet mesh 1131 of the bottom cover plate 113, and outside air can also enter the first air guide cover 60 through the bottom air inlet mesh 1131.

In an embodiment, referring to FIGS. 4 to 6, a ventilation gap 32 is provided between the first fan 20 and the second fan 30. In this way, a part of the air enters the first air guide cover 60 through the bottom air inlet mesh 1131 and enters the air inlet in the lower surface of the second fan 30, and the other part of the air enters the first outer housing 11 through the bottom air inlet mesh 1131 and the side air inlet mesh 1111, and enters the air inlet in the upper surface of the second fan 30 from the ventilation gap 32 between the first fan 20 and the second fan 30, thereby increasing cold air intake quantity of the second fan 30, so as to have a better heat dissipation effect.

In an embodiment, referring to FIGS. 4 to 6, the second outer housing 41 of the variable frequency power supply 40 is provided with a first lateral ventilation channel, and the air outlet of the first fan 20 is in communication with one end of the first lateral ventilation channel. An outer wall of the other end of the first lateral ventilation channel is connected to a vertical spacing plate 71 and a lateral spacing plate 72. The vertical spacing plate 71 and the lateral spacing plate 72 are arranged in periphery of the magnetron 50. The vertical spacing plate 71 is provided with a second vent 711, and the air outlet of the second fan 30 is in communication with the second vent 711. In this way, on the one hand, the cold air sent from the air outlet of the first fan 20 enters the first lateral ventilation channel to achieve better heat dissipation of the variable frequency power supply 40; on the other hand, under the action of the vertical spacing plate 71 and the lateral spacing plate 72, the two air flows will not be chaotic and partially offset, which improves the utilization rate of the cold air and ensuring the heat dissipation effect.

Further, referring to FIGS. 4 to 6, the lateral spacing plate 72 is further connected to the rear wall of the cooking cavity 12 and the rear cover plate 112 respectively. Similarly, the vertical spacing plate 71 is connected to the rear wall of the cooking cavity 12 and the rear cover plate 112 respectively.

In an embodiment, referring to FIGS. 4 to 6, a power connector 51 of the magnetron 50 is provided adjacent to the lateral spacing plate 72. The lateral spacing plate 72 is provided with a third vent 721 corresponding to the power connector of the magnetron 50, and the third vent 721 is located on a side of the lateral spacing plate 72 close to the vertical spacing plate 71. In this way, after the cold air of the first fan 20 flows out through the first lateral ventilation channel, a part of the air flows into a region where the magnetron 50 is located through the third vent 721. When the air flows into the region where the magnetron 50 is located from top to bottom, the air is i fully contacted with the magnetron 50 and sufficient heat exchange happens therebetween, which can better reduce the temperature of the magnetron 50. In addition, it is possible to avoid whirling air in the region where the magnetron 50 is located.

In an embodiment, referring to FIGS. 4 to 6, the cooking appliance with microwave heating function further includes a second air guide cover 73. A radiator shell 52 of the magnetron 50 is provided with a second lateral ventilation channel. The rear wall of the cooking cavity 12 is provided with a second rear air inlet mesh 121, and the second air guide cover 73 covers the second rear air inlet mesh 121. The second vent 711, the second lateral ventilation channel, and the air inlet of the second air guide cover 73 are in communication in sequence. In this way, the cold air from the second fan 30 enters the second air guide cover 73 through the second vent 711 and the second lateral ventilation channel, and then enters the inside of the cooking cavity 12 through the second rear air inlet mesh 121.

In an embodiment, referring to FIGS. 4 to 6, the air inlet of the second air guide cover 73 is provided with a heat conducting edge 731 which is attached to the magnetron 50. Specifically, the heat conducting edge 731 is attached to the radiator shell 52 of the magnetron 50, and the heat of the radiator shell 52 of the magnetron 50 is conducted to the second air guide cover 73 according to the heat conduction principle, which improves the heat dissipation effect of the magnetron 50.

In a specific embodiment, referring to FIGS. 4 to 6, a power connector 51 of the magnetron 50 is provided adjacent to the lateral spacing plate 72. The lateral spacing plate 72 is provided with a third vent 721 corresponding to the power connector of the magnetron 50, and the third vent 721 is located on a side of the lateral spacing plate 72 close to the vertical spacing plate 71. The cooking appliance with microwave heating function further includes a second air guide cover 73. A radiator shell 52 of the magnetron 50 is provided with a second lateral ventilation channel. The rear wall of the cooking cavity 12 is provided with a second rear air inlet mesh 121. The second air guide cover 73 covers the second rear air inlet mesh 121. The second vent 711, the second lateral ventilation channel, and the air inlets of the second air guide cover 73 are in communication in sequence. In this way, when only the air blown by the second fan 30 is contained in the second air guide cover 73, whirling air is easily generated in the second air guide cover 73, but after the third vent 721 is provided on the lateral spacing plate 72, the air blown by the first fan 20 can enter the region where the magnetron 50 is located from top to bottom through the third vent 721, and enters the inside of the second air guide cover 73, which helps to avoid the generation of whirling air and at the same time to have a better heat dissipation effect on the magnetron 50.

In an embodiment, referring to FIGS. 4 to 6, the cooking appliance with microwave heating function is a drawer-type microwave oven. The drawer-type microwave oven further includes a door 80 and a container for placing cooking objects connected to the door 80, and the door 80 is connected to a side wall of the cooking cavity 12 via a slide rail. In addition, the cooker body 10 is provided with an opening, and the door 80 is arranged corresponding to the opening.

Further, referring to FIGS. 4 to 6, the first outer housing 11 further includes a second side cover plate 114 and a top cover plate 115. The second side cover plate 114 is arranged opposite to the first side cover plate 111, and the second side cover plate 114 is connected to the rear cover plate 112 and the bottom cover plate 113, respectively. The three side edges of the top cover plate 115 are respectively connected to the first side cover plate 111, the rear cover plate 112 and the second side cover plate 114.

The aforementioned technical features of the embodiments may be arbitrarily combined. For the sake of brevity of description, not all possible combinations of the technical features in the aforementioned embodiments are described. However, as long as there is no contradiction between the combinations of these technical features, all should be considered as the scope of this specification.

The aforementioned embodiments only express several implementations of the present disclosure, and the descriptions thereof are more specific and detailed, but they cannot be understood as a limitation on the scope of the present disclosure. It should be noted that, for those who skilled in the art, a plurality of modifications and improvements can be made without departing from the concept of the present disclosure, which all belong to the protection scope of the present disclosure. Therefore, the protection scope of the present disclosure shall be subject to the appended claims.

As used herein, the term "coupled" can mean any physical, electrical, magnetic, or other connection, either direct or indirect, between two parties. The term "coupled" is not limited to a fixed direct coupling between two entities.

The invention claimed is:

1. A cooking appliance with microwave heating function, comprising:

a cooker body, including a first outer housing, and a cooking cavity arranged in the first outer housing, the first outer housing including a first side cover plate, a rear cover plate and a bottom cover plate, the first side cover plate being connected to the rear cover plate, and the first side cover plate and the rear cover plate being both connected to the bottom cover plate, the first side cover plate being provided with a side air inlet mesh at one of corner parts thereof close to the rear cover plate and the bottom cover plate, and the bottom cover plate being provided with a bottom air inlet mesh at one of corner parts thereof close to the first side cover plate and the rear cover plate;

a first fan, a second fan, a variable frequency power supply and a magnetron, which are all arranged in a spacing region between a rear wall of the cooking cavity and the rear cover plate, a plane where an air inlet of the first fan is located being arranged obliquely with respect to the bottom cover plate, and facing the side air inlet mesh and the bottom air inlet mesh, a plane where an air outlet of the first fan is located being arranged to face the variable frequency power supply, a plane where an air inlet of the second fan is located facing the bottom air inlet mesh or the side air inlet mesh, and a plane where an air outlet of the second fan is located being arranged to face the magnetron.

2. The cooking appliance with microwave heating function of claim 1, wherein the rear cover plate is provided with a first rear air inlet mesh at one of corner parts thereof close to the first side cover plate and the bottom cover plate.

3. The cooking appliance with microwave heating function of claim 1, wherein the first fan is arranged above the second fan, an included angle between a first central axis of the first fan and a second central axis of the second fan is A, and A is less than 90°.

4. The cooking appliance with microwave heating function of claim 3, wherein the second fan is a turbo fan, an upper surface and a lower surface of the turbo fan are both provided with air inlets, the lower surface of the turbo fan is connected to a first air guide cover, a top plate of the first guide cover is provided with a first vent in communication with the air inlet of the lower surface of the turbo fan, a fan motor of the turbo fan is arranged in the first air guide cover, the first air guide cover covers a part of a region of the bottom air inlet mesh, and a projection of the first fan on the bottom cover plate along a vertical direction is located on another part of the region of the bottom air inlet mesh.

5. The cooking appliance with microwave heating function of claim 4, wherein a ventilation gap is provided between the first fan and the second fan.

6. The cooking appliance with microwave heating function of claim 4, wherein a second outer housing of the variable frequency power supply is provided with a first lateral ventilation channel, and the air outlet of the first fan is in communication with one end of the first lateral ventilation channel, an outer wall of the other end of the first lateral ventilation channel is connected to a vertical spacing plate and a lateral spacing plate, the vertical spacing plate and the lateral spacing plate are arranged in periphery of the magnetron, a second vent is provided on the vertical spacing plate, and the air outlet of the second fan is in communication with the second vent.

7. The cooking appliance with microwave heating function of claim 6, wherein a power connector of the magnetron is arranged adjacent to the lateral spacing plate, the lateral spacing plate is provided with a third vent corresponding to the power connector of the magnetron, and the third vent is located on a side of the lateral spacing plate close to the vertical spacing plate.

8. The cooking appliance with microwave heating function of claim 6, further comprising a second air guide cover, a radiator shell of the magnetron being provided with a second lateral ventilation channel, the rear wall of the cooking cavity being provided with a second rear air inlet mesh which is covered by the second air guide cover, the second vent, the second lateral ventilation channel, and an air inlet of the second air guide cover being in communication in sequence.

9. The cooking appliance with microwave heating function of claim 8, wherein the air inlet of the second air guide cover is provided with a heat conducting edge which is attached to the magnetron.

10. The cooking appliance with microwave heating function of claim 1, wherein the cooking appliance with microwave heating function is a drawer-type microwave oven, further comprising a door and a container for placing cooking objects connected to the door, and the door being connected to a side wall of the cooking cavity via a slide rail.

* * * * *